US005611498A

United States Patent [19]

Miller, III et al.

[11] Patent Number: 5,611,498
[45] Date of Patent: Mar. 18, 1997

[54] SEAT BELT RETRACTOR WITH AUXILIARY SHAFT LOAD LIMITING

[75] Inventors: Harold J. Miller, III, Troy; Niels Dybro, Utica, both of Mich.

[73] Assignee: AlliedSignal Inc., Morristown, N.J.

[21] Appl. No.: 514,073

[22] Filed: Aug. 11, 1995

[51] Int. Cl.[6] .................................................. B60R 22/28
[52] U.S. Cl. ............................................................ 242/379.1
[58] Field of Search .......................... 242/379.1; 280/805, 280/806; 297/470, 471, 472, 476, 477, 478

[56] References Cited

U.S. PATENT DOCUMENTS 3,927,846  12/1975  Meissner ............................. 242/379.1
3,952,967   4/1976  Barile et al. ......................... 242/379.1

FOREIGN PATENT DOCUMENTS 4324967   1/1995  Germany ............................... 280/805

Primary Examiner—John M. Jillions
Attorney, Agent, or Firm—Markell Seitzman

[57] ABSTRACT

A seat belt retractor comprising seat belt webbing; a spool for storing webbing thereon, the spool rotationally mounted on a frame; a rewind spring for rewinding or retracting the webbing; at least one drive gear having gear teeth mounted for rotation with the spool; an auxiliary shaft rotationally mounted on the frame including a least one driven gear thereon in meshing engagement with the at least one drive gear; a ratchet nut mounted to rotate with and slide along the auxiliary shaft; a first lock bar for preventing the rotation of the ratchet nut while permitting the nut to slide relative to the auxiliary shaft; a first energy absorbing bushing mounted about the auxiliary shaft and in selective contact with the ratchet nut for generating when deformed by the ratchet nut a relatively constant reaction force on the spool to oppose any protraction of the webbing during an emergency.

10 Claims, 5 Drawing Sheets

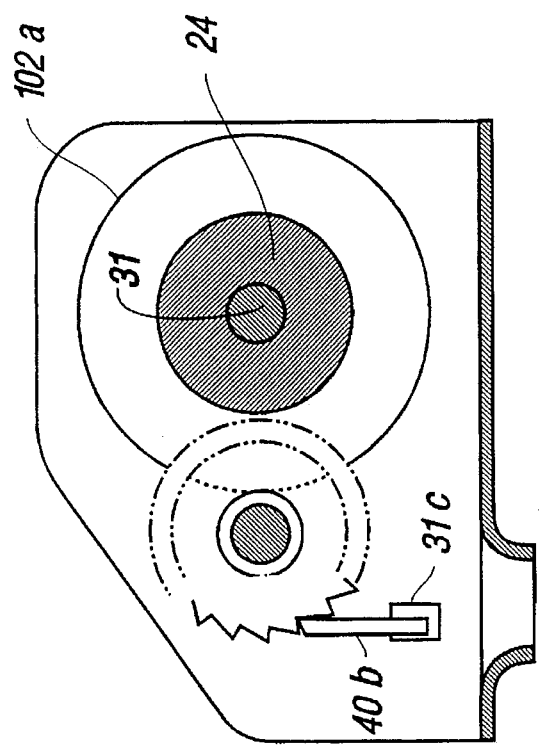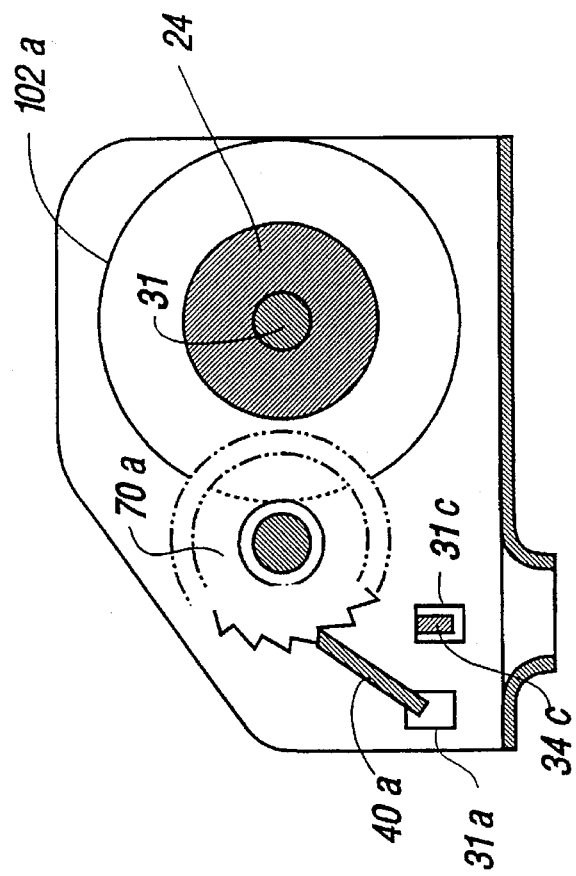

SEAT BELT RETRACTOR WITH AUXILIARY SHAFT LOAD LIMITING

The present invention generally relates to seat belt retractors and more particularly to a retractor that generates a generally constant reaction force on the seat belt during an accident in response to occupant loading.

BACKGROUND AND SUMMARY OF THE INVENTION

U.S. Pat. No. 4,309,001 shows a seat belt retractor having a primary web receiving spool and an auxiliary shaft linked by gear. A rotating member travels on the auxiliary shaft to selectively control the position of a lock pawl. This retractor generally functions as an automatic locking retractor (ALR) and does not dissipate nor absorb energy as in the present invention. U.S. Pat. Nos. 3,952,967 and 3,927,846 show retractors having means for dissipating energy during a crash by deforming a part of the retractor.

It is an object of the present invention to provide a seat belt retractor that generates a generally constant, limited level, reaction force on the seat belt during an accident or emergency thereby limiting the loads that can be exerted on the seat belt by the occupant and in doing so providing a means of dissipating or absorbing crash energy. A further object of the present invention is to provide a retractor in which the above functions are generated remote from and communicated to the main spool of the retractor.

Accordingly, the invention comprises: a seat belt retractor comprising a spool for storing webbing thereon, the spool is rotationally mounted on a frame; a rewind spring is used to rewind or retract the webbing. The retractor includes at least one drive gear, having gear teeth, mounted for rotation with the spool and an auxiliary shaft rotationally mounted on the frame including a least one driven gear thereon in meshing engagement with the at least one drive gear. A ratchet nut is mounted to rotate with and slide along the auxiliary shaft. A first lock means prevents the rotation of the ratchet nut while permitting the nut to slide relative to the auxiliary shaft. A first energy absorbing means is mounted about the auxiliary shaft and is in selective contact with the ratchet nut for generating, when deformed by the ratchet nut, a relatively constant reaction force on the spool to oppose any protraction of the webbing during an emergency. An alternate embodiment of the invention includes a second ratchet nut, lock means and energy absorbing such as a bushing and means for activating the lock means in correspondence with certain accident parameters. In this manner the retractor can generate one of three different levels of reactive force on the seat belt.

Many other objects and purposes of the invention will be clear from the following detailed description of the drawings.

BRIEF DESCRIPTION OF THE DRAWINGS

In the drawings:

FIGS. 7 and 8 are cross-sectional views of FIG. 5.

DETAILED DESCRIPTION OF THE DRAWINGS

Figure 1:
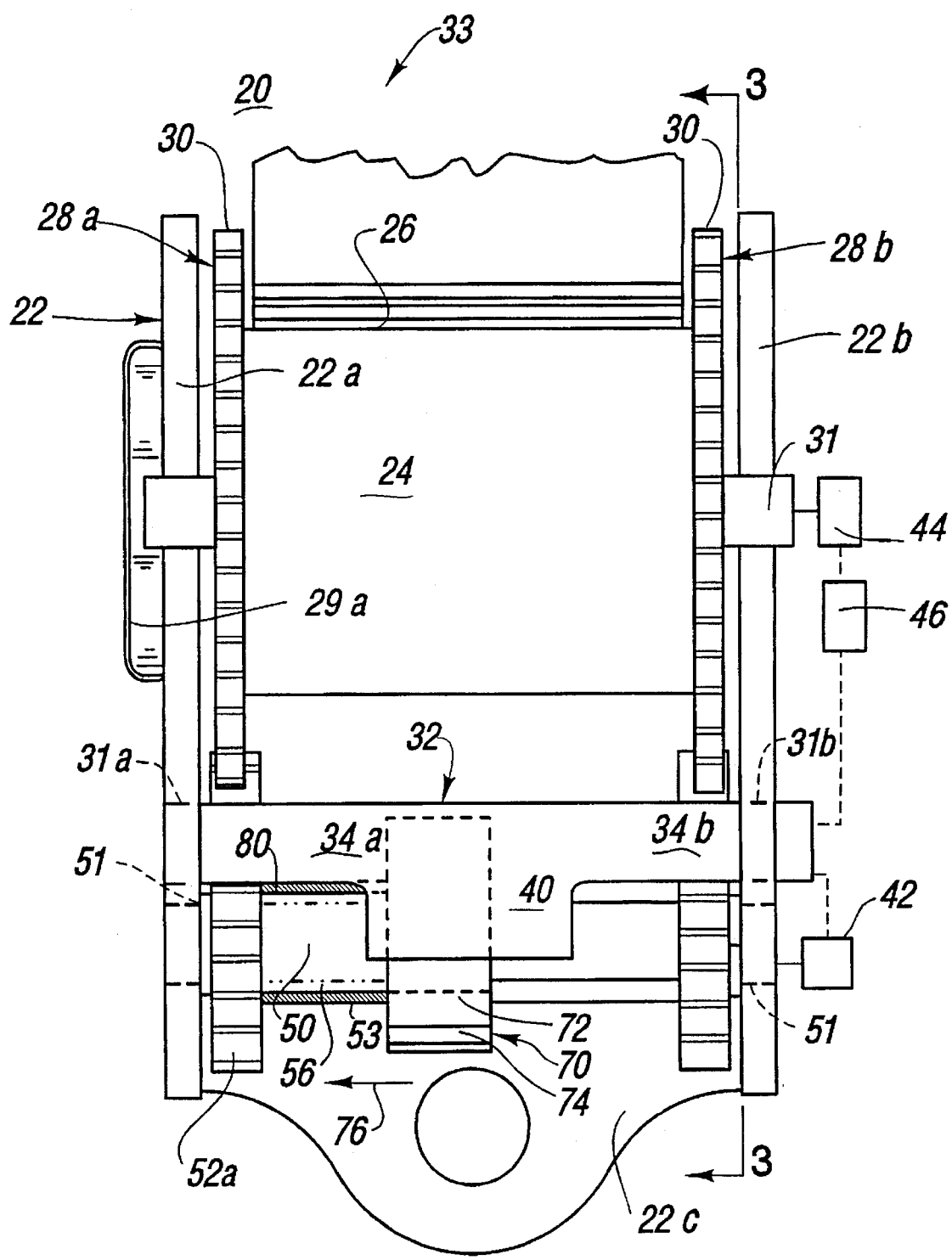
FIG. 1 illustrates a front plan view of the present invention.
Figure 2:
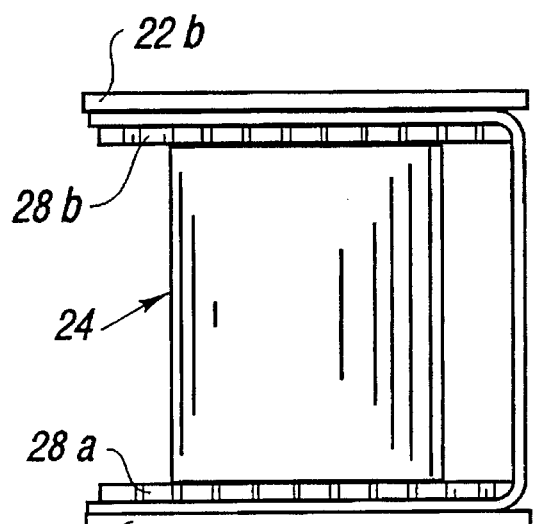
FIG. 2 is a top plan view of the invention.

Reference is made to FIGS. 1 through 4 which illustrate a seat belt retractor generally shown by numeral 20. The retractor comprises a U-shaped frame 22 having portions 22a, 22b and 22c. Rotationally supported, in a known manner relative to the frame is a primary web receiving spool 24 about which a seat belt or seat belt webbing 33 is wound. The spool 24 comprises a central body 26 and at least one drive gear. The preferred embodiment uses two gears 28a and 28b that also function as flanges to retain the belt 33. The gears may be integral or separate from the spool. Each of the gears 28a or 28b include a plurality of gear teeth generally shown as 30. A lock bar 32 including end wings 34a and 34b is rotationally supported in openings 31a and 31b in the frame sides and a lock tooth portion 40. The lock bar is moved from a deactivated position to an activated position by use of one or more sensing mechanisms as discussed below. The retractor additionally includes a return spring 29 of known construction attached between the frame 22 and a shaft 31 of the spool to retract the webbing after it has been extended. A spring housing 29a protects the spring 29.

Rotatably supported on the frame sides 22a and 22b is an auxiliary shaft 50. The shaft 50 is supported by openings, bushings or bearings 51 and the like in a known manner. Situated near ends of the auxiliary shaft 50 are driven gears 52a and 52b each of which have teeth 54 that matingly engage teeth 30 of at corresponding drive gear 28a or 28b. As can be seen from FIG. 1, the outer wall 53 of the auxiliary shaft 50 is threaded. Such threads are shown by numeral 56. Rotatably supported on the auxiliary shaft 50 is a ratchet-nut member generally shown by numeral 70. This member 70 includes internal threads 72 and a plurality of lock teeth 74. Loosely received about the auxiliary shaft is an energy absorbing bushing 80.

During the normal operation of the retractor, that is as the spool 24 is rotated as the webbing 33 is protracted and retracted, the driven gears 52a and 52b on the auxiliary shaft 50 rotate by engagement with the gears 28a and 28b. Also during this phase of operation the ratchet-nut member 70 rotates with the auxiliary shaft 50 due to the inherent friction between the threads 56 and 72. During an emergency situation the lock bar 40 is moved to its activated position by for example an inertial sensor such as a vehicle sensor or web sensor, into engagement with one of the teeth 74 on ratchet-nut 70, thereby preventing the ratchet-nut 70 from rotating with the auxiliary shaft 50. Retractors often include a separate vehicle sensor 42 such as a pendulum or standing-man which moves in response to excessive vehicle deceleration. The movement of this type of sensor is used to move the lock bar 32 to its activated position. Retractors also typically include a web sensor 44 keyed to the retractor spool. The web sensor is activated when the webbing is extended at a rate increase above a predetermined level. The vehicle sensor 42 and web sensor 44 are often used in conjunction with a lock cup 46. The movement of such lock cup can be used to move the lock bar to its activated position. U.S. Pat. No. 4,328,934 shows a vehicle sensor moving a lock bar and European patent application EP 0 228 729 shows the use of lock cup type of sensing mechanism moving a lock bar. Both of these patents are incorporated herein by reference. As the interplay between a lock bar 32 and sensing mechanisms are known, it is not necessary to discuss these features in any detail. The web sensor if used can be attached to sense the rotation of either the primary spool shaft or the rotation of the auxiliary shaft. Similarly, the lock cup can be keyed to the spool or auxiliary shaft.

Figure 4:
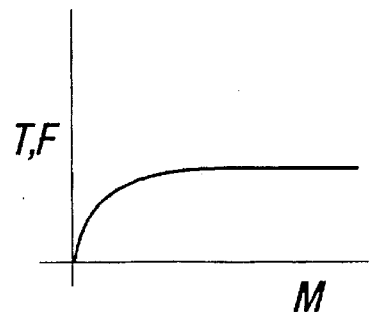
FIG. 4 an illustrative graph of reactive force or torque as a function of the movement of a nut.
Figure 3:
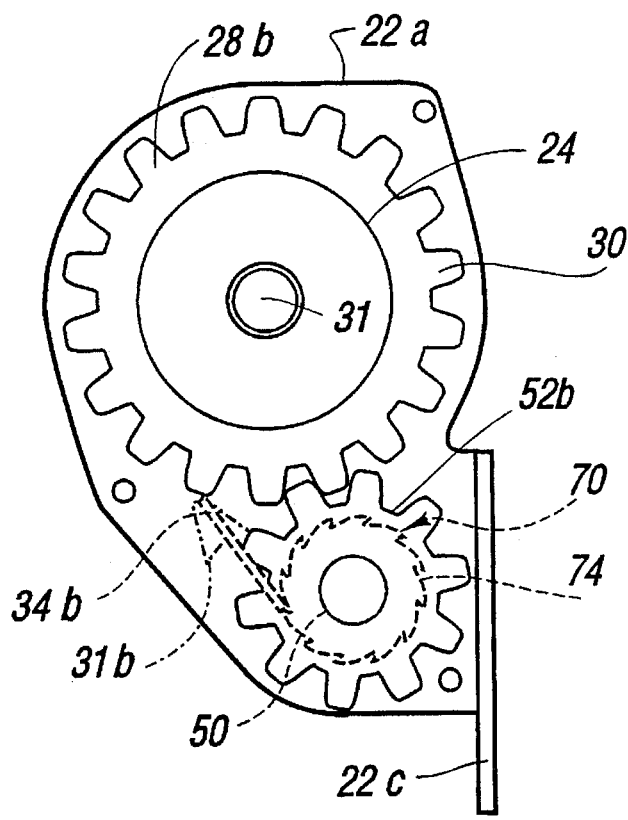
FIG. 3 shows a locked retractor.

During the emergency situation the lock bar 32 is placed into engagement with the teeth 74 of the ratchet-nut member 70 by operation of the inertial sensors. Thereafter the vehicle occupant will typically load the seat belt 33 as he moves or tends to move forward as a result of a frontal accident loading the webbing (seat belt) 33 and loading spool 24. The load on the spool 24 by virtue of the meshing engagement of the gears 28*a,b* and 52*a,b* is transferred to the auxiliary shaft 50. With the lock bar 32 moved to its activated position the ratchet-nut 70 is now rotationally fixed by the toothed portion 40 of the lock bar 32. The belt forces transferred to the auxiliary shaft cause the auxiliary shaft to rotate, whereupon the ratchet-nut 70 slides relative to the lock tooth 40 and moves to the left (as shown in FIG. 1, see arrow 76) on the cooperating 56 and 72 threads compressing the energy absorbing bushing 80 located about the auxiliary shaft. The bushing 80 may be made of plastic, copper or aluminum. As the bushing 80 is crushed or bent it dissipates or absorbs energy and generates a relatively constant reaction torque, upon being crushed beyond its yield strength, on the ratchet-nut 70 which in turn loads the auxiliary shaft 50. This reaction torque is transferred to the spool 24 through the gear 28*a,b*/52*a,b* engagement. FIG. 4 graphically shows the relationship between reaction force F, or torque T, and the displacement or movement M, of the nut 70. This transferred reaction force or torque acting on the spool, provides a constant limited load or force, or energy dissipation or absorption level which acts in opposition to occupant load and on the extension of the seat belt webbing 33. While the preferred embodiment of the invention has been shown with double sided force transmittal achieved by the pairs of gears 52*a* and 52*b* and 28*a* and 28*b*, it should be appreciated that only one set of mating gears need be used. Additionally, while a rotationally mounted lock bar has been shown to engage a ratchet-nut 70, a one-sided, rotationally mounted locking pawl might also be used. Additionally, the simple gear arrangement may be replaced by other arrangements such as a planetary gear set.

Figure 6:
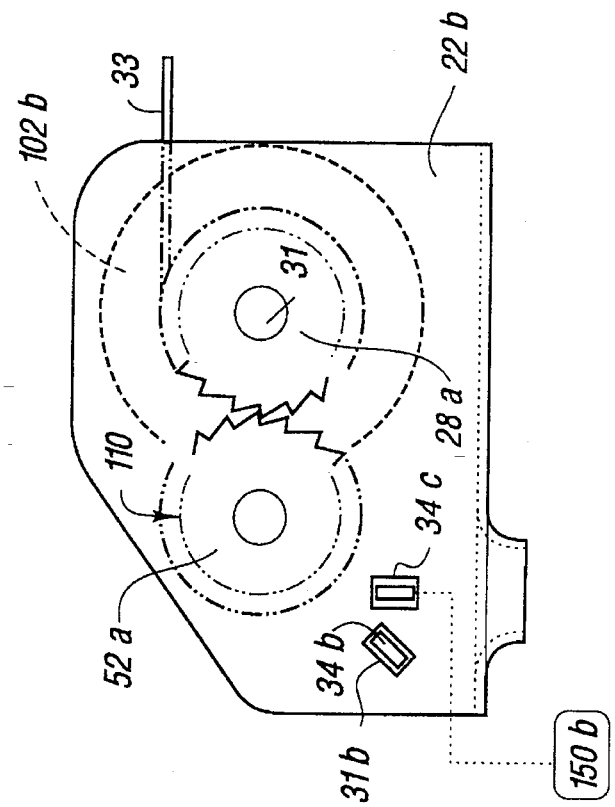
FIGS. 5 and 6 illustrate an alternate embodiment of the invention
Figure 5:
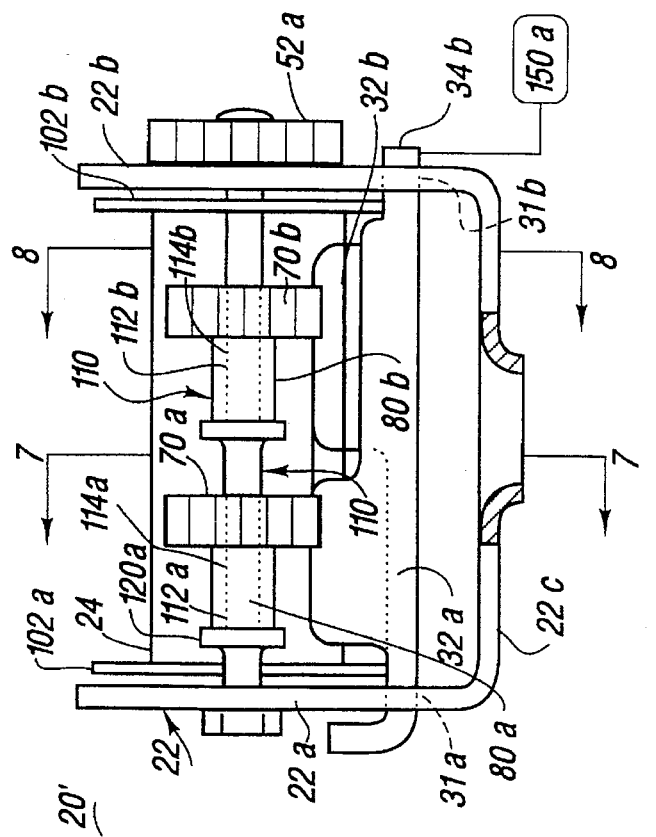

Reference is now made to FIGS. 5 and 6 which illustrate an alternate embodiment of the invention. The above described embodiment showed how to generate a single level, generally constant reactive force on seat belt webbing to oppose and control the motion of the occupant. The embodiment shown below shows how this reactive force can be made variable and to at least vary with certain accident parameters. By an accident parameter it is meant a parameter that is useful in ascertaining the intensity of a crash or the level of crash energy. Such parameters include vehicle mass, vehicle stiffness, vehicle closing speed relative to an object and/or simply vehicle speed. Additionally, these accident parameters include parameters specific to the occupant to be protected. Additional accident parameters would include occupant mass and size, seating position relative to the steering wheel or instrument panel, etc.

Once having sensed, monitored, or predicted the crash conditions, the system generally will be able to decide the level of reactive force that should be generated to protect the occupant. As an example, vehicle road speed or the closing speed with a barrier or other vehicle parameters can readily be obtained from a wheel speed sensor of an anti-lock braking system and closing speed can be obtained from known radar or vehicle position detection systems (closing speed being the derivative of position). The general size of an occupant can be obtained by many means. Some indirect ways of determining occupant size (and implicitly his or her weight or mass) include measuring the height of the D-ring or web guide (that supports) the shoulder belt (a measurement of upper torso size) or by monitoring seat position (lower torso size). Seat position and seat back angle also provide an understanding of how close an occupant might be to the steering wheel or dash board and a measure of the limit of how much travel forward is permitted. As an example, if an occupant is of a small size it might be advantageous to generate a lower level constant reactive force as compared to the desired force needed to control a larger occupant. As can be appreciated over a given period of time if a higher reactive force acts on the seat belt in comparison to a smaller force the amount of webbing permitted to protract from the spool is less. With a small sized occupant who is seated close to the steering wheel or instrument panel, the system would generate a higher reactive force to reduce the permitted amount of occupant motion in comparison to a situation in which the occupant is seated away from the steering wheel or instrument panel. As can be appreciated if the occupant is seated further away from a barrier, i.e. a steering wheel or instrument panel, the retractor or system can permit the controlled amount of occupant travel to be greater (the amount of travel is controlled by the level of reactive force generated). An example of directly measuring occupant size might include ultra-sonic or microwave distance monitoring devices or pattern recognition devices.

It can be seen from FIGS. 5 and 6 this alternate retractor 20' utilizes a similar spool 24 and frame 22. The spool 24 includes two opposing flanges 102*a* and 102*b* to retain the webbing 33 wound thereabout. Shaft 31 (see FIG. 6) of the primary spool 24 is connected to a single drive gear 28*a*. This drive gear is located remote from the spool 24, on the outside of the frame, but is rotatable with the spool by virtue of the shared shaft 31. Retractor 20' additionally includes an auxiliary shaft generally shown by numeral 110. The auxiliary shaft is connected to a single secondary or driven gear such as 52*a*. The auxiliary shaft includes a first and a second threaded portion 112*a* and 112*b* having threads 114*a* and 114*b* respectively. Rotatably mounted on the first threaded portion is a first ratchet-nut 70*a*. A second ratchet-nut 70*b* is mounted on shaft threads 114*b*. A first bushing 80*a* is mounted about shaft 110 between the first ratchet-nut 70*a* and an enlarged portion of the shaft 110 and provides a first stop 120*a*. A second bushing 80*b* is located between the second ratchet-nut 70*b* and a second stop 120*b*. Rotatably positioned on the frame 22 relative to the spool 24 is a first lock bar 32*a* and a second lock bar 32*b* supported in frame openings 31*a* and 31*b*, and 31*c* and 31*d* respectively. Opening 31*d* is not visible but located opposite opening 31*c*. Each of the lock bars 32*a* and 32*b* is moved by independently controllable activation devices 150*a,b*, such as linear or rotary electrically activated solenoids, electromagnets, etc., that are activated in correspondence with a vehicle crash parameter(s) upon sensing for example that the vehicle closing speed or vehicle deceleration is above a predetermined level or that the vehicle's anti-locking brake system has been activated, etc. The activation devices 150*a,b* are linked to ends 34*b* and 34*c* of the lock bars 32*a* and 32*b*. Generation of the activation signals can also be generated by monitoring an inertia sensor that is responsive to changes in lateral or sideways deceleration or acceleration and one which generates an electrical signal indicative of such changes. The activation of the lock bars 32*a* and 32*b* can be accomplished by using inertia sensors that are activated at different deceleration levels.

As can be appreciated from the description of the alternate embodiment of the invention, when either lock bar is in engagement with a corresponding ratchet-nut, a reactive force will be generated on the seat belt in opposition to the occupant generated loading on the belt thereby controlling occupant forward motion. The level of reactive force corresponds principally to the energy dissipating characteristics of the particular bushing such as 80a or 80b as well as the gear ratio, size of bushing, etc. As such, it can be appreciated that a multi-level reactive force can be generated by selectively activating one or both of the lock bars 32a and/or 32b. As an example, if the bushings 80a and 80b are of the same material and if one of the lock bars such as 32a is moved to its activated position, a first level of reactive force can be generated upon the belt being loaded by the occupant. Alternatively, if both of the lock bars 80a and 80b are simultaneously moved to their activated positions, the reactive force generated will be the sum of that of the individually engaged ratchet nuts as both ratchet-nuts generate a reactive force on the auxiliary shaft. This invention further provides for the generation of three levels of reactive forces. This can be achieved by using materials having different yield strength, size, or crush characteristics for the bushings 80a and 80b. As such, the first level of reactive force can be achieved by locking ratchet-nut 70a and a second level of reactive force generated by only locking ratchet-nut 70b. A third level of reactive force can be generated by simultaneously locking both ratchet-nuts 70a and 70b.

Figure 9:
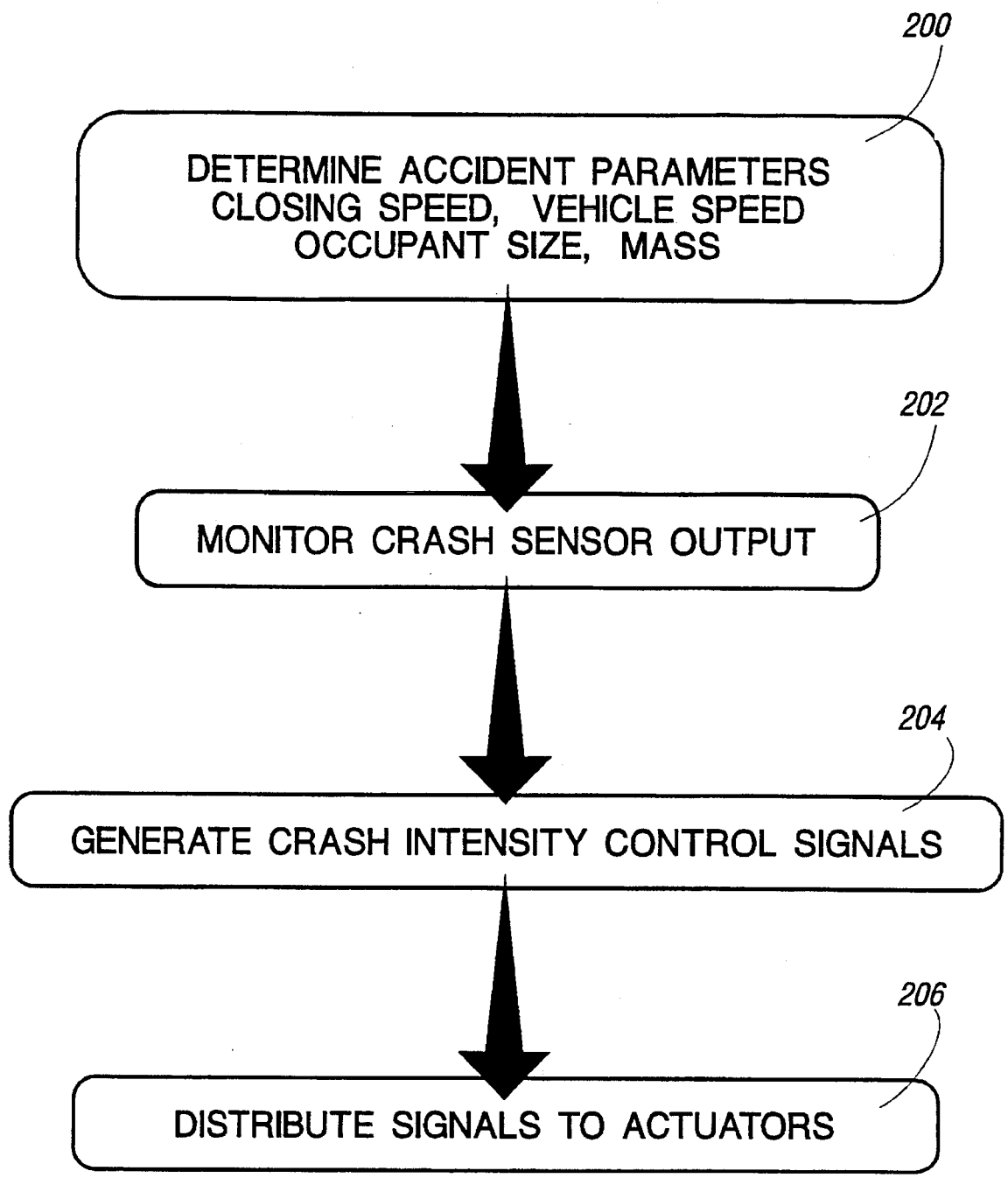
FIG. 9 illustrates a flow diagram.

Reference is made to FIG. 9 which illustrates a flow chart showing the operation of this second embodiment of the invention. Block 200 represents the step of determining accident parameters such as the closing speed, vehicle speed, occupant size, seating position, etc. Which may be performed on a continuous basis as conditions change. The information is stored for subsequent use. Vehicle crash sensors, such as those used to activate an air bag or seat belt pretensioner are continuously monitored to determine the beginning of an emergency (block 202). Thereafter, upon sensing the initiation of the actual accident the ECU will generate one of three control signal sets as shown in block 204 to selectively activate one or both of the actuators 150 in correspondence with the level of reaction force to be generated (block 204). These control signal sets comprise a signal to the electronic activation device 150a (block 206) to activate lock bar 32a or a signal to activation device 150b which in turn activates lock bar 32b and finally a combined signal to both activation devices 150a and b to simultaneously activate lock bars.

Many changes and modifications in the above described embodiment of the invention can, of course, be carried out without departing from the scope thereof. Accordingly, that scope is intended to be limited only by the scope of the appended claims.

We claim:

1. A seat belt retractor comprising seat belt webbing and a spool for storing the webbing thereon, the spool rotationally mounted on a frame;

a rewind spring for rewinding or retracting the webbing;

at least one drive member rotatable with the spool;

an auxiliary shaft including a least one driven member thereon operatively linked with the at least one drive member;

a first movable member mounted to rotate with and slide along the auxiliary shaft;

first lock means for preventing the rotation of the first movable member while permitting the first movable member to slide relative to the auxiliary shaft;

first energy absorbing means mounted about the auxiliary shaft and in selective contact with the first movable member for generating when deformed by the first movable member a reaction force on the spool to oppose any protraction of the webbing during an emergency.

2. The device as defined in claim 1 including a second movable member rotatably and slidably mounted to the auxiliary shaft;

second energy absorbing means mounted about the auxiliary shaft and in selective contact with the second movable member for generating when deformed by the second movable member a second reaction force on the spool to aid in opposing any protraction of the webbing during an emergency and second lock means for preventing the rotation of the second movable member while permitting the second movable member to slide relative to the auxiliary shaft.

3. The device as defined in claim 1 including first activation means for moving the first lock means to halt the rotation of the first movable member.

4. The device as defined in claim 3 including second activation means for moving the second lock means to halt the rotation of the second movable member.

5. The device as defined in claim 4 including control means for activating the first and second activation means one of severally and jointly.

6. The device as defined in claim 5 wherein the control means includes third means for determining an accident parameter and fourth means for generating one or more control signals to selectively lock activate the first and second activation means.

7. The device as defined in claim 1 wherein the drive member and the driven member include meshing teeth.

8. A seat belt retractor comprising seat belt webbing;

a spool for storing webbing thereon, the spool rotationally mounted on a frame;

a rewind spring for rewinding or retracting the webbing;

at least one drive member mounted for rotation with the spool;

an auxiliary shaft rotationally mounted on the frame including a least one driven member thereon in operative engagement with the at least one drive member;

lock wheel means comprising at least two movable members, positioned about the auxiliary shaft for deforming a corresponding deformable member; the lock wheel means slidably and rotatably mounted to the auxiliary shaft;

first lock means for preventing the rotation of the first movable member while permitting the member to slide relative to the auxiliary shaft;

first energy absorbing means mounted about the auxiliary shaft and in selective contact with the first movable member for generating when deformed a relatively constant reaction force on the spool to oppose any protraction of the webbing during an emergency, second lock means for preventing the rotation of the second movable member while permitting the member to slide relative to the auxiliary shaft;

second energy absorbing means mounted about the auxiliary shaft and in selective contact with the second movable member for generating when deformed a relatively constant reaction force on the spool to oppose any protraction of the webbing during an emergency.

9. The device as defined in claim 8 including actuator means for selectively moving the first and the second lock means into an activated position.

10. The device as defined in claim 9 in combination with a control unit, wherein the actuator means are activated in correspondence with one or more accident parameters used in the control unit.

* * * * *